United States Patent [19]

Chieng

[11] Patent Number: 4,978,969
[45] Date of Patent: Dec. 18, 1990

[54] METHOD FOR PRINTING USING ULTRA-VIOLET CURABLE INK

[75] Inventor: C. K. Chieng, Bukit Merah Central, Singapore

[73] Assignee: Hewlett-Packard Company, Palo Alto, Calif.

[21] Appl. No.: 376,349

[22] Filed: Jul. 5, 1989

[51] Int. Cl.$^5$ .............................................. B41J 2/05
[52] U.S. Cl. ..................................... 346/1.1; 106/22; 346/25; 346/140 R; 427/54.1
[58] Field of Search .................... 346/1.1, 140, 75, 25; 106/20, 22; 427/54.1

[56] References Cited

U.S. PATENT DOCUMENTS

| | | | |
|---|---|---|---|
| 4,003,751 | 1/1977 | Carder | 106/20 |
| 4,137,138 | 1/1979 | Batt | 106/20 X |
| 4,228,438 | 10/1980 | Vazirani | 346/1.1 |
| 4,258,367 | 3/1981 | Mansukhani | 346/1.1 |
| 4,303,924 | 12/1981 | Young | 346/1.1 |

Primary Examiner—Joseph W. Hartary

[57] ABSTRACT

An ink composition and application method are described which enable the printing of high-resolution images on a variety of substrates (especially plastics.) The composition basically includes an ultra-violet curable adhesive in combination with a selected dye pigment and one or more solvents. The composition is preferably applied using a thermal ink jet delivery system. After application, the composition is exposed to ultra-violet light, resulting in the formation of a permanent image. The materials and methods of the invention are capable of producing a high-resolution image without causing damage to the substrates.

6 Claims, No Drawings

METHOD FOR PRINTING USING ULTRA-VIOLET CURABLE INK

BACKGROUND OF THE INVENTION

The present invention generally relates to ink compositions, and more particularly to ultra-violet curable inks suitable for application to plastic materials and other substrates using ink jet technology.

Many products currently use parts and components having printed symbols thereon. These components include keyboard keycaps, as well as plastic machine parts which require part numbers or other identifying information.

To produce printed components, methods have been developed which involve the application of heated inks or dyes to the components. However, these methods present a variety of problems when actually used, especially with respect to plastics. For example, heated inks often damage or disfigure the plastic components during application. Also, the print resolution achieved using conventional ink application methods is often inadequate for small components and parts.

Accordingly, a need exists for an ink composition and application method which enable the printing of characters on plastic components as well as other substrates while avoiding the problems indicated above. The present invention satisfies this need as described in detail below.

SUMMARY OF THE INVENTION

It is an object of the present invention to provide an ink composition which effectively prints images and characters on plastic components and other selected substrates.

It is another object of the invention to provide an ink composition having a high degree of adhesion to plastics, thereby enabling plastic materials to be marked in a permanent manner.

It is a further object of the invention to provide an ink composition which is easily manufactured from readily available materials.

It is an even further object of the invention to provide an ink composition which is easily applied using ink jet technology.

It is a still further object of the invention to provide an ink composition which is capable of producing high resolution images and characters.

In accordance with the foregoing objects, an ink composition and application method are disclosed which enable the printing of high-resolution images and characters on selected substrates, especially plastics. The composition basically includes an ultra-violet curable adhesive in combination with a selected dye pigment and one or more solvents. The composition is preferably applied to the substrates using an ink jet delivery system. After application, the composition is exposed to ultra-violet light, resulting in the formation of a permanent image. The materials and methods of the invention are capable of producing high-resolution images and characters. When plastic components are used, the invention avoids damage to the components due to excessive heat and other problems which occur when conventional imaging technniques are used.

These and other objects, features, and advantages of the invention will become apparent from the following Detailed Description of a Preferred Embodiment and Examples.

DETAILED DESCRIPTION OF A PREFERRED EMBODIMENT

The present invention involves an ink composition and application method which enable plastic components and other materials (e.g. metals) to be marked in a highly effective manner. As described herein, an ultra-violet curable ink composition is provided which includes three basic components.

The first component involves an ultra-violet curable adhesive capable of rapidly curing upon exposure to ultra-violet light in about 0.5–10 minutes, depending on the specific adhesive and composition of the final product. Rapid curing enables the printed images or characters to be instantaneously stabilized, which is important when high-speed, mass production printing is desired. A typical adhesive useable in the invention includes a product sold under the name "GAFGARD 233" which consists of an aliphatic urethane-based oligomer. This material is manufactured and sold by the GAF Corporation of Wayne, New Jersey. Another adhesive suitable for use in the invention involves a product sold under the name "3-BOND 3070" by the Three Bond Company of Tokyo, Japan. This material consists of an ester-based acrylate compound. However, other ultra-violet curable adhesives known in the art may be used herein, and the present invention shall not be limited to the adhesives described above.

Curing of the adhesive materials normally involves the application of ultra-violet light from a conventional ultra-violet light system. A typical light system consists of a medium pressure mercury vapor discharge lamp in an air or nitrogen atmosphere. The wavelength of the ultra-violet light will normally range from about 254nm–420nm, with a curing time of about 0.5–10.0 minutes. Curing time and wavelength may be experimentally varied, depending on the materials used in the ink composition, the type of substrate to which the ink is applied, and other operational factors. Additional information regarding curing will be described below.

The second major component consists of a selected dye pigment. A wide variety of dye pigments may be used, depending on the desired color of the printed images or characters. Exemplary dye pigments are listed below in Table I:

TABLE I

| Dye Name | Color | Composition |
| --- | --- | --- |
| Morfast Blue 100 | Blue | metal complexed phthalocyanine dye |
| Morfast Red 102 | Red | metal complexed azo dye |
| Morfast Black A | Black | azo dye |

Morfast Red 102 specifically consists of cobaltate bis-2,2'-dioxy 4[di[2{(2"-hydroxy-3"alkyloxypropyl]-]amino 5'-chloroazobenzene hydrogen. Dibutanammonium salt. Morfast Blue 100 consists of cuprate(2-),[29H,31H phthalocyanine disulfonato- (4-)$N^{29}$, $H^{30}$, $N^{31}$, $N^{32}$ di-1-alkan ammonium,-N-(alkyl) salt. Morfast Black A consists of methlium, tris[4-(dimethylamino) phenyl]-, salt with 3-[{(4-phenylamino)phenyl}azo] azo]benzene-sulfonic acid (1:1).

These materials are manufactured by Morton Thiokol, Inc. of Chicago Illinois. In addition, other dye pigments known in the art may be used, depending on the desired color of the printed images and characters. Accordingly, the invention shall not be limited to the compositions listed in Table I.

The third major component involves one or more solvents combined with the dye pigment and adhesive to produce a homogeneous product having a viscosity and surface tension suitable for use in ink jet printing systems. Preferred solvents include $H_2O$, methyl ethyl ketone, gamma-butyrolactone, isopropyl alcohol, and mixtures thereof. Other solvents known in the art may be used alone or in combination.

The solvents combined with the adhesives and dye pigments may be experimentally varied to ensure that a viscosity and surface tension suitable for ink jet printing is achieved. The invention shall not be limited to any specific solvent or combinations of solvents. Additional information regarding solvents is provided below in the "Example" section.

Finally, a diluent may be added to the composition, depending on the viscosity of the adhesive being used. The diluent is designed to dilute the adhesive so that ink jet systems may effectively deliver the ink. The "GAFGARD 233" AND "3-BOND 3070" adhesives are of moderately high viscosity, and the use of a diluent is advised. Suitable diluents for this purpose include vinyl pyrrolidone and n-isobutyl alcohol, although other materials having similar chemical characteristics may be used.

Not all adhesives will require a diluent, which shall be considered optional in the present invention. For example, adhesives with a sufficiently low viscosity (e.g. about 10 cps) may not need a diluent. When these adhesives are used, the solvents described above will provide sufficient dilution. Whether or not a diluent is used, it is important that the final ink composition be entirely homogeneous so that proper delivery may be achieved.

In a preferred embodiment, the final ink composition will include about 12-80% by weight ultra-violet curable adhesive (about 60% =preferred), about 10-40% by weight solvent (about 15% =preferred), and about 3-10% by weight dye pigment (about 5% =preferred). If needed, the composition will include about 10-40% by weight diluent (about 20% =preferred).

In addition, the final product will preferably have a viscosity of about 2-20 cps at 22 degrees C., and a surface tension of about 30-50 dynes/cm at 22 degrees C. These characteristics facilitate delivery of the product by an ink jet system, as discussed below.

Examples

The following formulations represent ink compositions produced in accordance with the invention. Other formulations may be prepared, and the invention shall not be limited to the compositions listed below:

| I. BLACK INK | |
|---|---|
| COMPONENT | WT. % |
| GAFGARD 233 (adhesive) | 60 |
| vinyl pyrrolidone (diluent) | 20 |
| methyl ethyl ketone (solvent) | 5 |
| gamma-butyrolactone (solvent) | 5 |
| $H_2O$ (solvent) | 5 |
| Morfast Black A (dye pigment) | 5 |

| II. BLUE INK | |
|---|---|
| COMPONENT | WT. % |
| GAFGARD 233 (adhesive) | 55 |
| vinyl pyrrolidone (diluent) | 20 |
| methyl ethyl ketone (solvent) | 5 |
| gamma-butyrolactone (solvent) | 5 |
| $H_2O$ (solvent) | 5 |
| isopropyl alcohol (solvent) | 5 |
| Morfast Blue 100 (dye pigment) | 5 |
| | 100% |

| III. RED INK (formulation no. 1) | |
|---|---|
| COMPONENT | WT. % |
| GAFGARD 233 (adhesive) | 60 |
| vinyl pyrrolidone (diluent) | 20 |
| methyl ethyl ketone (solvent) | 5 |
| gamma-butyrolactone (solvent) | 5 |
| $H_2O$ (solvent) | 5 |
| Morfast Red 102 (dye pigment) | 5 |
| | 100% |

| IV. RED INK (formulation no. 2) | |
|---|---|
| COMPONENT | WT. % |
| 3-BOND 3070 (adhesive) | 60 |
| vinyl pyrrolidone (diluent) | 20 |
| methyl ethyl ketone (solvent) | 5 |
| gamma-butyrolactone (solvent) | 5 |
| $H_2O$ (solvent) | 5 |
| Morfast Red 102 (dye pigment) | 5 |
| | 100% |

Ink Application

The ink compositions described herein are especially suited for delivery using ink jet printing technology (preferably thermal ink jet systems.) Typical thermal ink jet systems include an ink reservoir in fluid communication with an orifice plate and resistor assembly. This type of system is known in the art, and described in the *Hewlett-Packard Journal*, May 1985, Vol. 36, No. 5. In addition, exemplary ink jet systems with which the invention may be used are illustrated in U.S. Pat. Nos. 4,500,895; 4,794,409; 4,791,438; 4,677,447; and 4,490,728. However, the invention shall not be limited to any partcular type of ink jet system, and may be used in a wide variety of systems known in the art including those listed above.

To print images or characters on a substrate, the ink composition is loaded into a selected ink jet system. The ink is them jetted onto the substrate, followed by ultraviolet curing of the ink. As described above, curing of the ink involves the application of ultra-violet light (preferably about 254nm-420nm) over a time period of about 0.5-10 min. Ultra-violet light systems known is the art may be used, including a medium pressure mercury vapor discharge lamp in an air or nitrogen atmosphere. The light wavelength and curing time may be suitably varied in accordance with the selected ink composition.

Thermal ink jet delivery of the ink compositions described herein results in printed characters or images which are permanent and have a high resolution (up to 600 dots per inch by 300 dots per inch). Also, the materials and methods of the invention enable the printing of images on a wide variety of plastic substrates including polybutylene terephthalate (PBT), acrylonitrile-butadiene-styrene (ABS), acrylonitrile-butadiene-styrene blended with polycarbonate (ABS/PC) and other thermoplastic materials known in the art. As previously described, printing is accomplished without physical/thermal disfiguration of the plastic materials, which frequently occurs when conventional printing methods are used.

In addition, the materials and methods of the invention may also be used on non-plastic substrates, including metals. Accordingly, the invention shall not be limited to the use of any specific substrate, and is widely applicable to a variety of materials.

The present invention represents an advance in the art of ink printing technology. Ink jet delivery of the materials described herein enables substrates to be printed in a rapid, efficient, and inexpensive manner. The use of ink jet technology allows the entire printing process to be automated, enabling customized printing to be readily accomplished. The generation of intermediate printed papers or films as required by conventional printing processes is not required.

Having herein described a preferred embodiment of the invention, it is anticipated that suitable modifications may be made thereto by individuals skilled in the art. For example, a variety of different ultra-violet curable adhesives, solvents, and dye pigments may be used. Also, the invention shall not be limited to the specific composition ranges specified herein, which represent preferred embodiments. Finally, a variety of different ink jet delivery systems may be used, as indicated above. The invention shall therefore be construed only in accordance with the following claims:

I claim:

1. A method for printing comprising the steps of:
   providing printing means for delivering ink to a substrate, said printing means comprising a thermal ink jet printing apparatus;
   supplying said thermal ink jet printing apparatus with an ultra-violet curable ink composition comprising in combination about 12-80% by weight ultra-violet curable adhesive, about 3-10% by weight dye pigment, and about 10-40% by weight solvent;
   delivering said ink composition from said thermal ink jet printing apparatus to said substrate; and
   applying ultra-violet light to said substrate with said ink composition thereon in an amount sufficient to form a permanent image on said substrate from said ink composition.

2. The method of claim 1 wherein said composition further comprises at least one diluent for reducing the viscosity of said adhesive.

3. The method of claim 2 wherein said composition comprises about 10-40% by weight diluent.

4. The method of claim 1 wherein said ink composition has a viscosity of about 2-20 cps at 22° C., and a surface tension of about 30-50 dynes/cm at 22° C.

5. The method of claim 1 wherein said applying of said ultra-violet light comprises the step of applying ultra-violet light having a wavelength of about 254-420 nm over a time period of about 0.5-10 minutes.

6. A method for printing comprising the steps of:
   providing printing means for delivering ink to a substrate, said printing means comprising a thermal ink jet printing apparatus;
   supplying said thermal ink jet printing apparatus with an ultra-violet curable ink composition comprising in combination about 12-80% by weight ultra-violet curable adhesive, about 3-10% by weight dye pigment, about 10-40% by weight of at least one solvent, and about 10-40% by weight of a diluent for reducing the viscosity of said adhesive, said ink composition having a viscosity of about 2-20 cps at 22° C. and a surface tension of about 30-50 dynes/cm at 22° C.;
   delivering said ink composition from said thermal ink jet printing apparatus to said substrate; and
   applying ultra-violet light having a wavelength of about 254-420 nm to said substrate over a time period of about 0.5-10 minutes in order to form a permanent image on said substrate from said ink composition.

* * * * *